(12) United States Patent
Cao (10) Patent No.: US 9,510,034 B2
(45) Date of Patent: *Nov. 29, 2016

(54) PLUG AND PLAY METHOD AND SYSTEM OF VIEWING LIVE AND RECORDED CONTENTS

(71) Applicant: Jianhua Cao, Walnut, CA (US)

(72) Inventor: Jianhua Cao, Walnut, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/670,402

(22) Filed: Mar. 26, 2015

(65) Prior Publication Data

US 2016/0088329 A1    Mar. 24, 2016

Related U.S. Application Data

(63) Continuation of application No. 14/495,861, filed on Sep. 24, 2014, now Pat. No. 9,124,946.

(51) Int. Cl.

| | |
|---|---|
| *H04N 7/16* | (2011.01) |
| *H04N 7/10* | (2006.01) |
| *H04N 7/025* | (2006.01) |
| *H04N 7/173* | (2011.01) |
| *H04N 21/258* | (2011.01) |
| *H04N 21/6547* | (2011.01) |
| *H04L 29/06* | (2006.01) |
| *H04L 29/08* | (2006.01) |
| *H04N 21/61* | (2011.01) |
| *H04N 21/218* | (2011.01) |
| *H04N 21/2187* | (2011.01) |
| *H04N 21/643* | (2011.01) |
| *H04N 21/6334* | (2011.01) |
| *H04L 29/14* | (2006.01) |
| *G08B 13/196* | (2006.01) |
| *H04L 29/12* | (2006.01) |

(52) U.S. Cl.
CPC .... *H04N 21/25816* (2013.01); *H04L 63/0428* (2013.01); *H04L 63/083* (2013.01); *H04L 63/10* (2013.01); *H04L 67/10* (2013.01); *H04L 69/40* (2013.01); *H04N 21/2181* (2013.01); *H04N 21/2187* (2013.01); *H04N 21/21805* (2013.01); *H04N 21/6125* (2013.01); *H04N 21/6334* (2013.01); *H04N 21/64322* (2013.01); *H04N 21/6547* (2013.01); *G08B 13/19656* (2013.01); *H04L 61/2514* (2013.01); *H04L 61/2575* (2013.01); *H04L 61/2589* (2013.01)

(58) Field of Classification Search
USPC .............................. 725/30, 34, 93, 116, 146
See application file for complete search history.

(56) References Cited

U.S. PATENT DOCUMENTS

| | | | |
|---|---|---|---|
| 2011/0105154 A1* | 5/2011 | Kim ........................ | H04W 4/00 455/458 |
| 2011/0119716 A1* | 5/2011 | Coleman, Sr. ......... | H04N 7/181 725/62 |

(Continued)

*Primary Examiner* — Brian T Pendleton
*Assistant Examiner* — Alexander Gee
(74) *Attorney, Agent, or Firm* — Raymond Y. Chan; David and Raymond Patent Firm (57) ABSTRACT

A plug and play method of viewing live and recorded contents includes the steps of: requesting information of a capturing device by a remote control center; sending an accessing request from an Internet-enabled receiving device to the remote control center through Internet; verifying whether the information of the capturing device matches with the accessing request from the receiving device by the remote control center; and establishing a communication channel between the capturing device and the receiving device to enable contents captured by the capturing device to be transmitted to the receiving device in a live manner through Internet.

17 Claims, 7 Drawing Sheets

(56) References Cited

U.S. PATENT DOCUMENTS

2011/0289228 A1* 11/2011 Chen ................... H04L 67/02
709/228

2012/0113264 A1* 5/2012 Moshrefi ............... H04H 20/38
348/157

* cited by examiner

PLUG AND PLAY METHOD AND SYSTEM OF VIEWING LIVE AND RECORDED CONTENTS

CROSS REFERENCE OF RELATED APPLICATION

This is a Continuation application that claims the benefit of priority under 35U.S.C. §119 to a non-provisional application, application Ser. No. 14/495,861, filed Sep. 24, 2014.

NOTICE OF COPYRIGHT

A portion of the disclosure of this patent document contains material which is subject to copyright protection. The copyright owner has no objection to any reproduction by anyone of the patent disclosure, as it appears in the United States Patent and Trademark Office patent files or records, but otherwise reserves all copyright rights whatsoever.

BACKGROUND OF THE PRESENT INVENTION

Field of Invention

The present invention relates to an Internet based monitoring system, and more particular to a plug and play method and system for viewing live and recorded contents, wherein no IP (Internet protocol) address is required for configuring a capturing device in order to enable the user to view the live and/or recorded contents from the capturing device through Internet.

Description of Related Arts

Surveillance camera has been configured into Internet camera, such as IP camera or network camera, to provide an alternative way for people to conveniently check in on their pets at home from their desk at work or to monitor their business from their computer at home in real time. In particular, once the IP camera is configured to connect to the Internet, the IP camera allow people to view the live video remotely by any Internet-enabled electronic device such as personal computer, laptop, tablet, or mobile phone.

In addition to Internet service, IP camera requires an electrical power supply remained in connection, an Internet environment, such as DSL connection, Wi-Fi environment, mobile Internet, and etc., and a static IP address in order to enable the connection between the IP camera and the Internet. Therefore, each IP camera has its own IP address in order to link to the Internet. However, the configuration of IP camera is complexity that the user must have a certain level of communicative information technology to look for the IP address assigned on a network. Generally speaking, when the computer is connected to the network through Internet each time, an IP address will be automatically assigned. However, most users are unable to search for the IP address or are unsure whether the assigned IP address is the static IP address. Accordingly, the general consumers must call the technical support of the Internet service provider for help. It is time consuming for the user to configure the IP camera before it is operated. When one of the configuring steps of the IP camera is uncorrected, the IP camera will not be worked as advertised. It is worth mentioning that most Internet service providers supply dynamic IP address to the customers, wherein the dynamic IP address will be changed frequently. Therefore, before the setup of the IP camera, the user must confirm whether the IP address from the Internet service provider is the static IP address or the dynamic IP address. Generally, the user will have to pay additional monthly fee to the Internet service provider in order to obtain the static IP address.

After the time consuming configuration of the IP camera, the IP camera cannot be worked right the way. The user must install or downward a corresponding application in the Internet-enabled electronic device. In other words, another configuration of the application is required for connecting the Internet-enabled electronic device with the corresponding IP camera. It is worth mentioning that when the user wants to view the live video from the IP camera by different electronic devices, the application must be installed into each electronic device. For example, if the user wants to access the IP camera by the laptop, tablet and mobile phone, the application must be individually installed into all the laptop, tablet and mobile phone while the configuration of the application must be individually setup in the laptop, tablet, and mobile phone.

Furthermore, if the IP camera is connected to a public Internet rather than a private IP configuration, the IP camera becomes open to anyone. Hackers and/or hoaxers can easily hack to the IP camera to unsanctioned invasion of privacy. Besides, the video records of the IP camera are generally sent and recorded in a server connected therewith in the site where the IP camera located and the user is required to access such video records from the server via the Internet connection between the server and the Internet-enabled electronic devices as mentioned above. Some web-based service providers set up the server for multiple users to register and upload their video records of their IP cameras so that the users may access the video records from the servers via Internet by logging in the web site designated by the service provider. However, such public server must be a system that is big and powerful enough for keeping huge memories, disk space and bandwidth of video records and multi-million users to access at the same time. It is complicated and costly and thus generally requires the users to pay expensive membership fee to receive such service.

SUMMARY OF THE PRESENT INVENTION

The invention is advantageous in that it provides a plug and play method and system for viewing live and recorded contents, wherein no IP (Internet protocol) address is required for configuring a capturing device in order to enable the user to view the live and/or recorded contents from the capturing device through Internet.

Another advantage of the invention is to a plug and play method and system for viewing live and recorded contents, wherein the configuration of the capturing device is simple and quick as plug and play that by connecting the capturing device to the remote control center through Internet, the captured information of the capturing device will automatically be remotely accessable by the owner of the capturing device through his or her Internet-enabled electronic receiving devices via Internet. Therefore, the configuring step of the capturing device is simplified that any common consumer or user is able to setup the capturing device in seconds.

Another advantage of the invention is to a plug and play method and system for viewing live and recorded contents, wherein two or more receiving devices can be linked to two or more capturing devices and the remote control center so as to enable the receiving devices to receive different contents from different capturing devices at different locations.

Another advantage of the invention is to a plug and play method and system for viewing live and recorded contents, wherein the receiving device can access the content from the capturing device in a real time manner.

Another advantage of the invention is to a plug and play method and system for viewing live and recorded contents, wherein the content from the capturing device can be directly saved in the storage device and played back to the receiving device.

Another advantage of the invention is to a plug and play method and system for viewing live and recorded contents, wherein the receiving device is able to access the designated capturing device through Internet without the information of the IP address of the capturing device, such that no particular application or software is required for being installed or downloaded to the receiving device. In other words, the user does not require any configuring step for the receiving device to link with the capturing device and can view the live contents from the capturing device through any web browser or his or her receiving device, such as an Internet-enabled electronic device.

Additional advantages and features of the invention will become apparent from the description which follows, and may be realized by means of the instrumentalities and combinations particular point out in the appended claims.

According to the present invention, the foregoing and other objects and advantages are attained by a plug and play method of viewing live and recorded contents, comprising the following steps.

(1) Request locator information of a capturing device, such as CAM ID and PIN code that substantially protects and provides high security of live video access and privacy, by a remote control center once the capturing device is connected to a power supply and the remote control center through Internet, wherein the locator information of the capturing device does not contain any IP address of capturing device.

(2) Send an accessing request for the capturing device from an Internet-enabled receiving device to the remote control center through Internet.

(3) Verify whether the locator information of the capturing device matches with the accessing request from the receiving device by the remote control center.

(4) Establish a communication channel between the capturing device and the receiving device to enable contents captured by the capturing device to be transmitted to the receiving device in a live manner through the Internet.

In accordance with another aspect of the invention, the present invention comprises a system for viewing live and recorded contents by an Internet-enabled receiving device, comprising:

at least a capturing device containing locator information that does not contain an IP address and being configured for linking with the receiving device through Internet; and a remote control center operatively linked to the capturing device through Internet and arranged for receiving an accessing request from the receiving device through Internet, wherein the locator information of the capturing device is sent to the remote control center when the capturing device is powered and connected to the remote control center, wherein the remote control center comprises a verifying module for verifying whether the locator information of the capturing device matches with the accessing request from the receiving device, and a communication channel being established between the capturing device and the receiving device once the locator information is verified for enabling contents captured by the capturing device to be transmitted to the receiving device in a live manner through Internet.

In one embodiment, the locator information of the capturing device includes a CAM ID and a PIN code that substantially protects and provides high security of live video access and privacy.

Still further objects and advantages will become apparent from a consideration of the ensuing description and drawings.

These and other objectives, features, and advantages of the present invention will become apparent from the following detailed description, the accompanying drawings, and the appended claims.

DETAILED DESCRIPTION OF THE PREFERRED EMBODIMENT

The following description is disclosed to enable any person skilled in the art to make and use the present invention. Preferred embodiments are provided in the following description only as examples and modifications will be apparent to those skilled in the art. The general principles defined in the following description would be applied to other embodiments, alternatives, modifications, equivalents, and applications without departing from the spirit and scope of the present invention.

Figure 1:
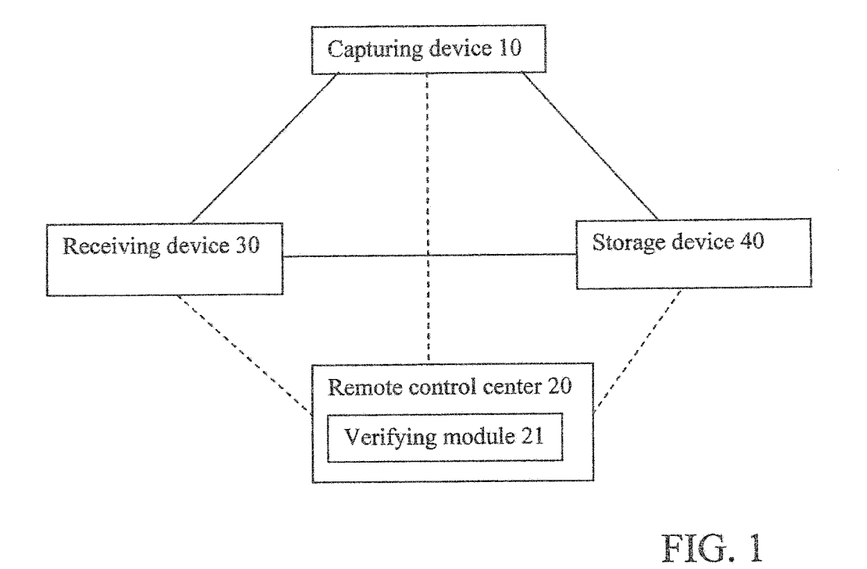
FIG. 1 is a schematic view of a system according to a preferred embodiment of the present invention, illustrating the relationship among the receiving device, capturing device, storage device, and remote control center.

Referring to FIG. 1 of the drawings, a plug and play system of viewing live and recorded contents according to a preferred embodiment of the present invention is illustrated, wherein the system comprises at least a capturing device 10, a remote control center 20 for linking the capturing device 10 with at least one Internet-enabled electronic receiving device 30 and at least a storage device 40. Accordingly, referring to FIGS. 1-5, the preferred embodiment of the present invention further provides a plug and play method of viewing live and recorded contents which comprises the following steps.

Figure 6:
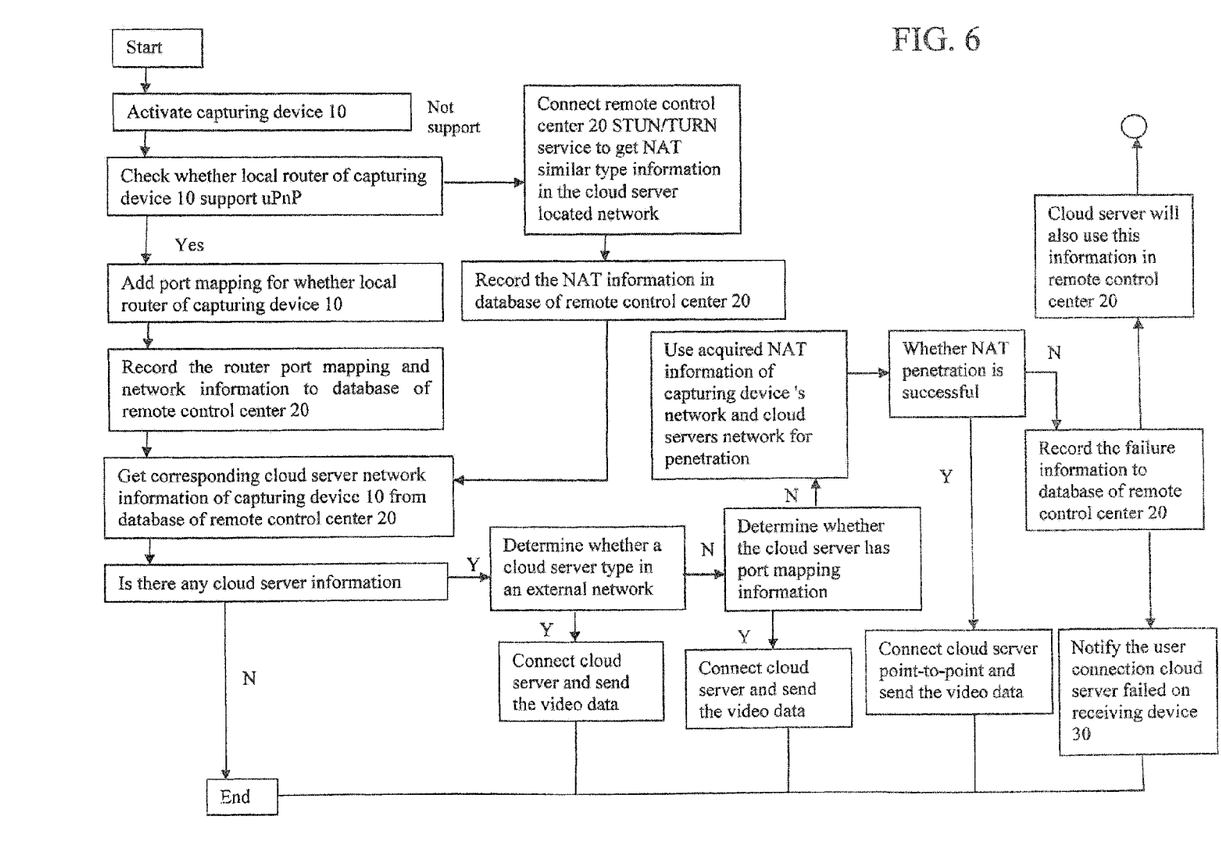
FIG. 6 is a flow diagram of the capturing device according to the above preferred embodiment of the present invention.

(1) Request locator information of the capturing device 10 by the remote control center 20 once the capturing device 10 is powered and connected to the remote control center 20 through the Internet, wherein the locator information of the capturing device 10 does not contain any IP address of the capturing device 10. The remote control center 20 will automatically configure the capturing device 10, as shown in FIG. 6, without obtaining any IP address of the capturing device 10. In other words, no IP address is required for configuration of the capturing device 10.

According to the preferred embodiment of the present invention, the locator information includes a CAM ID and a PIN code of the capturing device 10. Each capturing device 10 should have a different CAM ID and PIN code provided either on the capturing device 10 or the packaging of the capturing device 10 for identification and verification, wherein the PIN code substantially protects and provides high security of live video access and privacy.

Figure 8:
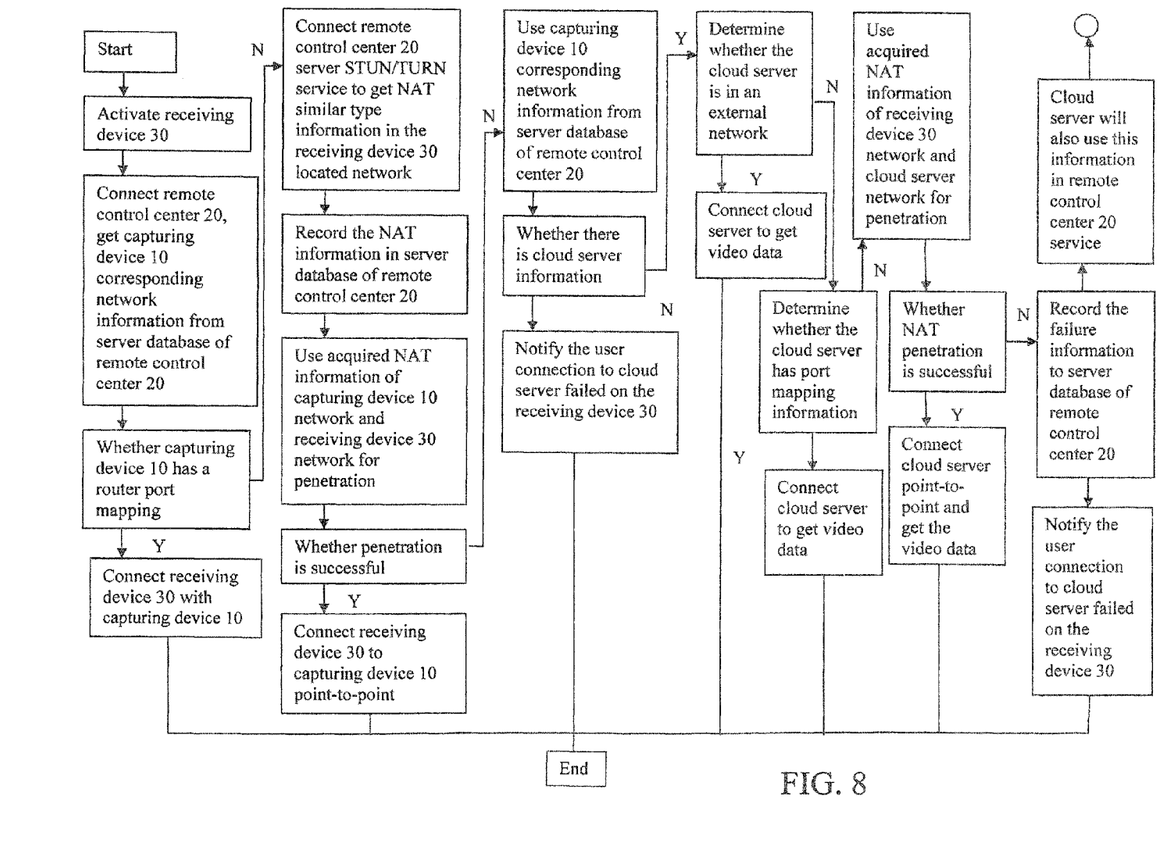
FIG. 8 is a flow diagram of the receiving device according to the above preferred embodiment of the present invention.
Figure 9:
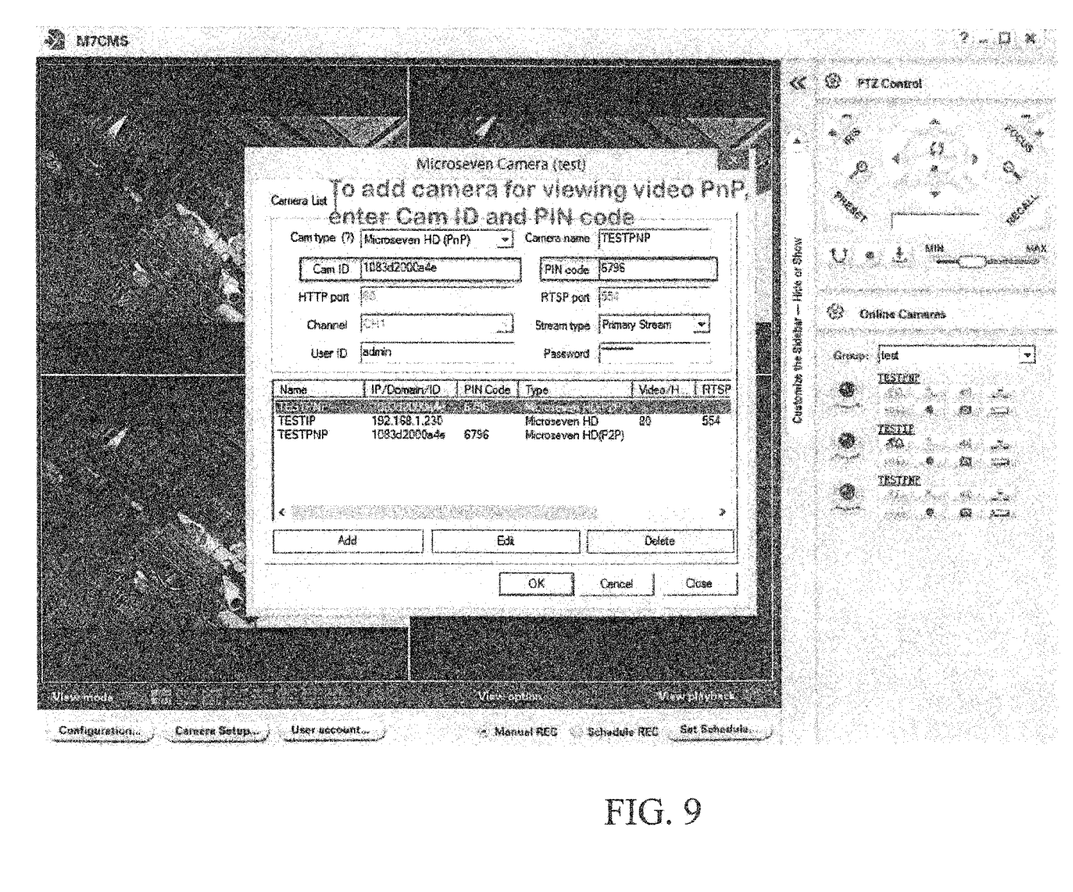
FIG. 9 is a schematic diagram of an access screen of receiving device, illustrating how a locator information is inputted and an accessing request for the capturing device is sent from the receiving device to the remote control center through Internet, according to the above preferred embodiment of the present invention.

(2) In order to enable the receiving device 30 to access the capturing device, send an accessing request for the capturing device 10 with the CAM ID and PIN code of the locator information of the capturing device 10 from the receiving device 30 to the remote control center 20 through the Internet, as shown in FIG. 9. The remote control center 20 is arranged to automatically configure the receiving device 30, as shown in FIG. 8.

(3) Verify whether the locator information of the capturing device 10 matches with the accessing request from the receiving device 30 by the remote control center 20.

Figure 2:
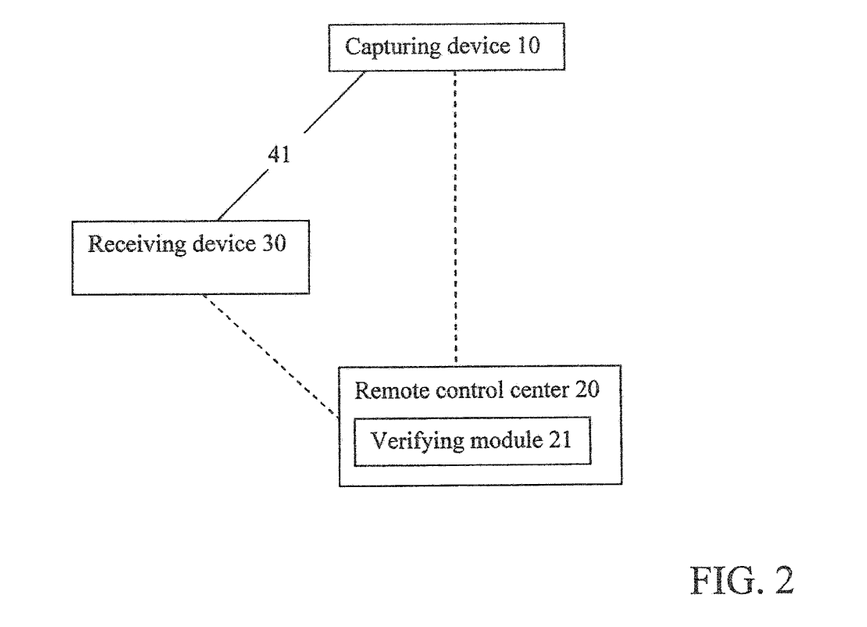
FIG. 2 illustrates a communication channel between the capturing device and the receiving device through the remote control center according to the above preferred embodiment of the present invention.

(4) Establish a communication channel 41 between the capturing device 10 and the receiving device 30 to enable the contents captured by the capturing device 10 to be transmitted to the receiving device 30 in a live manner through the Internet, as shown in FIG. 2.

According to the preferred embodiment, the remote control center 20 will search and locate the corresponding capturing device 10 in response to the CAM ID and the PIN code of the locator information received from the receiving device 30. Once the remote control center 20 grants the access between the receiving device 30 and the capturing device 10, the communication channel 41 will be automatically established for transferring the contents therebetween. If the access is denied by the remote control center 20, the remote control center 20 will send a notification to the receiving device 30 to indicate the connection failure or the access is denied.

Accordingly, the user is able to open any web browser, for example an APP (application of IOS or Android operation system), in the receiving device 30 in order to connect to the remote control center 20, such that the content captured by the capturing device 10 can be accessed by the receiving device 30 via the web browser through the communication channel 41 via the Internet. In other words, according to the preferred embodiment, once the communication channel 41 between the receiving device 30 and the capturing device 10 is established through the above step (1) to (4), an icon is preferred to be created when the web browser or APP is opened in the receiving device 30, so that when a user would like to access the live content captured by the capturing device 10 any time, the user may simply click on the icon to open a window to receive and view the content.

According to the preferred embodiment, the capturing device 10 can be placed at any desired location and can be a surveillance camera, a digital camera, a web camera, a video recorder, and/or an audio recorder for capturing image content, video content, audio content or other parameters. The locator information is pre-stored in the capturing device 10. According to preferred embodiment, the locator information includes the CAM ID and the PIN coder of the capturing device 10 while each capturing device 10 has an unique CAM ID and PIN code for identification and verification.

It is worth mentioning that it should be considered as alternative mode to person skilled in art to use or include a serial number, an accessing code, or other identification characters as the PIN code.

It is also worth mentioning that the CAM ID is an identification information of the capturing device 10 assigned by the manufacturer of the capturing device 10 or the remote control center 20 for that particular capturing device 10. A "Media Access Control" address (MAC address) could be used as the CAM ID that it is a unique identifier assigned to network interfaces for communications on the physical network segment. MAC addresses can be used as a network address for most IEEE (Institute of Electrical and Electronics Engineers) 803 network technologies, including Ethernet. Logically, MAC addresses are used in the media access control protocol sublayer of the OSI reference model.

According to the preferred embodiment of the present invention, the PIN code is embodied as a four digits secure number that it is as known like a bank PIN code when a user uses debit card or credit card. It can be assigned to the capturing device 10 by the manufacturer thereof or created by the owner of the capturing device 10. It is worth mentioning that, in order to prevent the unique CAM ID of the capturing device 10 be guessed or figured out by anyone other than the owner of the capturing device 10, the combination of the CAM ID and PIN code as the locator information can substantially protects video contents privacy from being hacked over the Internet.

The remote control center 20 is embodied as an Internet-based server that the user is able to access the remote control center 20 through Internet or any web browser, such as "GoogleChrome" or "Safari" from different operating systems.

In the step (1), when the capturing device 10, which is positioned at a predetermined location, is electrically powered and connected with the Internet with cable or wirelessly with Wi-Fi, Bluetooth, mobile Internet such as 4G and LTE, or etc., the capturing device 10 can be connected to the remote control center 20 through the Internet. The remote control center is configured to request locator information from the capturing device 10 and the capturing device 10 is configured to send the locator information, including the CAM ID and the PIN code, to the remote control center 20 to identified itself before the remote control center 20 which is configured to save the specific locator information of that capturing device 10 for further verification with the receiving device 30.

The user of the receiving device 30, embodied as an Internet-enabled computerizing device, such as a personal computer, a notebook computer, a tablet, a iPad, and a mobile phone, according to the preferred embodiment of the present invention, can link his or her receiving device 30 with the remote control center 20 through Internet. In other words, the capturing device 10 is connected to the remote control center 20 through Internet. As long as the internet connection is established, the remote control center 20 will automatically request the capturing device 10 to send the CAM ID and the PIN code of the locator information of the capturing device 10 to the remote control center 20. When the locator information of the capturing device 10 is accepted by the remote control center 20, the configuration of the capturing device 10 is completed.

It is worth mentioning that the plug and play system of the present invention can be arranged as one capturing device 10 to one receiving device 30, one capturing device 10 to many receiving devices 30, many capturing devices 10 to one receiving device 30, or many capturing devices 10 to many receiving devices 30 configurations. Therefore, different capturing devices 10 can be placed at different locations and different receiving devices 30 can access each and every capturing device 10 to view and/or listen the contents thereof.

Accordingly, a user registering step is preferably completed in the step (1). The user registering step comprises a step of inputting user information and locator information to the remote control center 20, as shown in FIG. 9, in order to identify the ownership of the capturing device 10. Preferably, a user pass code is sent by the remote control center 20 to the user.

In the step (2), in order to access the capturing device 10 through the receiving device 30, the receiving device 30 is required to first sending the accessing request to the remote control center 20 through the Internet. Accordingly, the receiving device 30 is an Internet-enabled receiving device such as a personal computer, laptop, tablet, or mobile phone that is able to access the content from the capturing device 10. For example, the accessing request contains a request of the locator information including the and the PIN code of the capturing device 10. For example, the user can login the APP or visit the web site of the remote control center 20 through the web browser in his or her receiving device 30 and select by clicking a specific icon of the designated capturing device 10. Then, the receiving device 30 sends an accessing request for the capturing device 10 to the remote control center 20 through the Internet, as shown in FIG. 9, and then the remote control center 20 will automatically configure the receiving device.

The remote control center 20 comprises a verifying module 21 for verifying whether the locator information i.e. the CAM ID and PIN code, of the capturing device 10 matches with the accessing request from the receiving device 30. After the remote control center 20 verifies the match between the capturing device 10 and the receiving device 30, the communication channel 41 is established between the capturing device 10 and the receiving device 30, as shown in FIG. 2. Then, the content being captured by the capturing device 10 is continuously transmitted to the receiving device in a live manner through the Internet and such content is viewable in the receiving device 30 by means of a viewer program stored in the receiving device 30.

It is worth mentioning that once the connection between the capturing device 10 and the remote control center 20 is established and configured (the step (1)), and after the receiving device 30 has sent the accessing request for the capturing device 10 (the step (2)), any subsequent accessing request sent from the receiving device 30 for that designated capturing device 10 does not require the remote control center 20 to request for locator information from that designated capturing device 10 again and the remote control center 20 will directly verify whether the locator information of the capturing device 10 matches with the accessing request from the receiving device 30. According to the preferred embodiment, the plug and play system does not repeat the step (1) and simply execute the steps (2)-(4) during a session of access by the receiving device 30 stays on. After the previous session of access is off, when the user would like to access the capturing device 10 again next time, it is preferred to create a new session through the step (1) to (4) again until this session is closed.

In view of above, it is appreciated that the setting up and configuration of the capturing device 10 is as simply as plugging in the electrical power connection and internet connection of each capturing device 10. The remote control center 20 can then configure the connection between that capturing device 10 therewith and enable a receiving device 30 registered and configured with the remote control center 20 to access the contents captured by the capturing devices 10 in a live time manner simply by clicking in the APP and play the captured contents.

Figure 3:
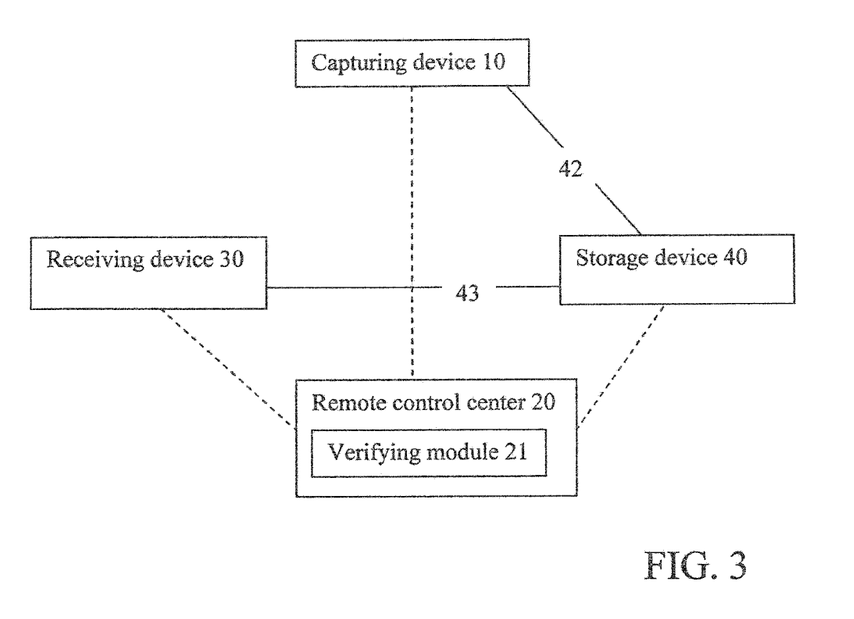
FIG. 3 illustrates a recording channel between the capturing device and the storage device and a playback channel between the storage device and the receiving device through the remote control center according to the above preferred embodiment of the present invention.

As shown in FIG. 3, the remote control center 30 further comprises a recording channel 42 being established between the capturing device 10 and the storage device 40 and a playback channel 43 between the storage device 40 and the capturing device 10, wherein the storage device 40 can be built in the remote control center 30 that when the content captured by the capturing device 10 is transmitted from the capturing device 10 to the receiving device 30, the content is also transmitted to the storage device 40 in the remote control center 20 to save the content in a storage hard drive of the storage device 40 so that the receiving device 30 can playback the content anytime via the playback channel 43 from the storage device 40. Alternatively, the storage device 40 could be an independent device located in different location than the remote control center 30, and accordingly, the step (1) may further comprises the following steps.

Figure 7:
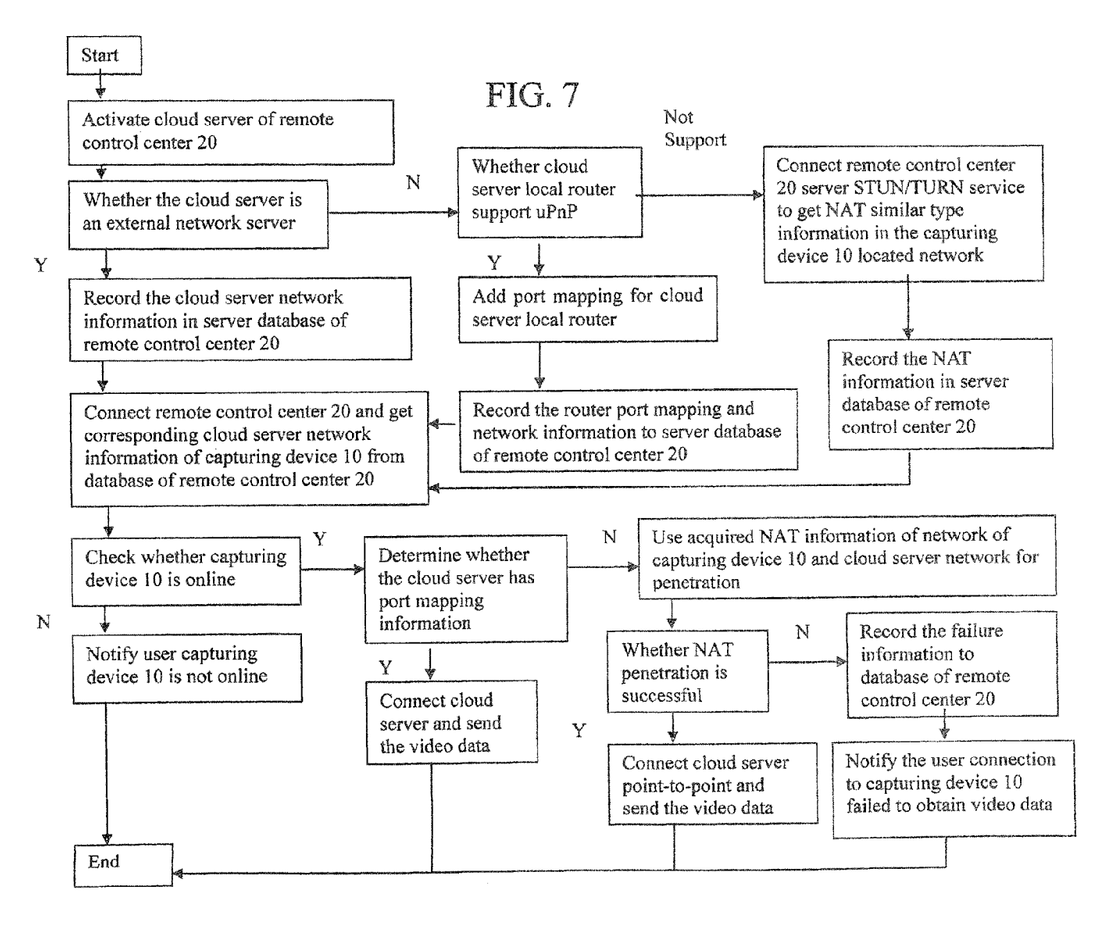
FIG. 7 is a flow diagram of the storage device according to the above preferred embodiment of the present invention.

(1.1) Request information of the storage device 40 by the remote control center 20 when the storage device 40 is connected to the remote control center 20 through Internet. Accordingly, the storage device 40 can be a hard disk installed into the computerizing device or a cloud storage being pre-setup by the user. The information of the storage device 40 can be the location of the hard disk or an address of the cloud storage, wherein the user is authorized to access the storage device 40. The remote control center 20 will automatically configure the storage device 40 as shown in FIG. 7.

(1.2) Verify whether the information of the storage device 40 matches with the information of the capturing device 10 by the remote control center 20. Likewise, the verifying module 21 of the remote control center 20 will verify the match between the information of the storage device 40 and the information of the capturing device 10.

(1.3) Establish the recording channel 42 between the capturing device 10 and the storage device 40 to enable the contents captured by the capturing device 10 to be transmitted and stored in the storage device 40, as shown in FIG. 3.

(1.4) Verify whether the information of the storage device 40 matches with the accessing request from the receiving device 30 by the remote control center 20. Once the contents captured by the capturing device 10 are stored in the storage device 40, the user is able to view contents in the storage device 40. The verifying module 21 of the remote control center 20 will verify the match between the information of the storage device 40 and the information of the receiving device 30.

(1.5) Establish the playback channel 43 between the storage device 40 and the receiving device 30 to enable said contents stored in the storage device 40 to be transmitted to the receiving device 30 through Internet. Accordingly, the user is able to access the contents stored in the storage device 40 through the receiving device 30 anytime via the playback channel 43 after the remote control center 20 grants the access between the receiving device 30 and the storage device 40 after security validation via the verifying module 21. Likewise, the user is able to open any web browser in the receiving device 30 in order to connect to the remote control center 20, such that the content stored in the storage device 40 can be accessed by the receiving device 30 via the web browser through the playback channel 43.

Figure 4:
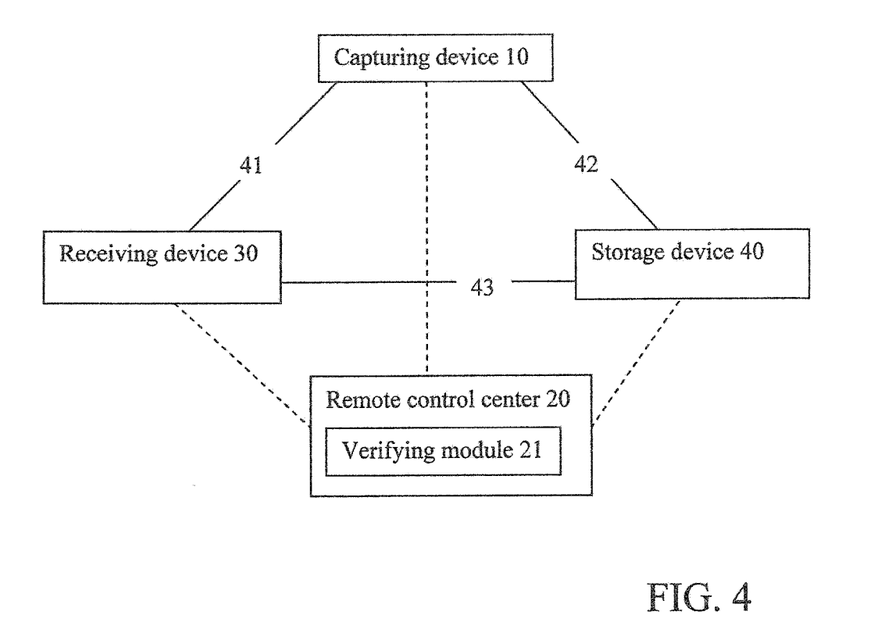
FIG. 4 illustrates the communication channel, the recording channel, and the playback channel linked among the capturing device, the receiving device, and the storage device through the remote control center according to the above preferred embodiment of the present invention.

It is worth mentioning that the user is able to access the contents from the capturing device 10 by the receiving device 30 through the communication channel 41 or the playback channel 43, as shown in FIG. 4. Through the communication channel 41, the user can view or listen the video and/audio contents from the capturing device 10 in a real time manner. Through the playback channel 43, the user can view or listen the video and/audio contents from the capturing device 10 stored in the storage device 40.

Figure 5:
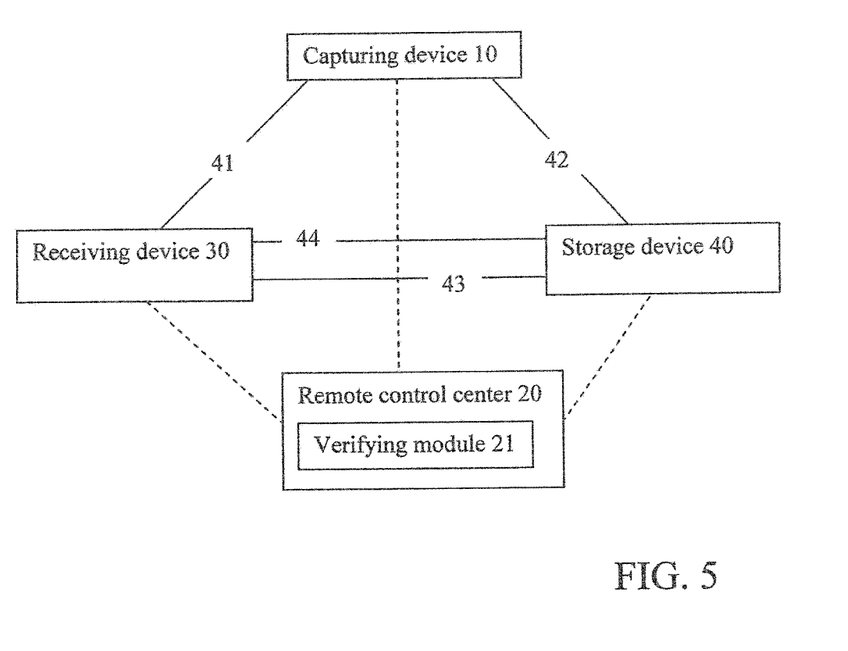
FIG. 5 illustrates an alternative communication channel between the capturing device and the receiving device through the remote control center according to the above preferred embodiment of the present invention.

As shown in FIG. 5, the remote control center 30 further comprises an alternative communication channel 44 being established between the storage device 40 and the receiving device 30 to enable the contents captured by the capturing device 10 to be transmitted to the receiving device 30 from the storage device 40 in a live manner through the Internet.

Accordingly, the user is able to access the content from the capturing device 10 in real time through either the communication channel 41 or the alternative communication channel 44. The content is directly sent from the capturing device 10 to the receiving device 30 in real time through the communication channel 41 once the capturing device 10 and the receiving device 30 are connected to the Internet. On the other hand, the content is indirectly sent from the capturing device 10 to the receiving device 30 in real time through the storage device 30 via the alternative communication channel 44 as long as the capturing device 10, the receiving device 30, and the storage device 40 are connected with each other through the Internet. It is worth mentioning that through the alternative communication channel 44, the content will be delayed to be sent to the receiving device 30 in less than one second. In particular, the delay time for the alternative communication channel 44 is about 0.3 second or less. Therefore, the user is still able to view or listen the video/audio contents from the capturing device 10 in real time through the alternative communication channel 44.

In accordance with the plug and play system of the present invention, the storage device 40 is an optional component, wherein, for real time access of the content being captured by the capturing device 10, as long as the capturing device 10, remote control center 20 and the receiving device 30 are connected with each other through the internet, the content being captured by the capturing device 10 can be accessed via the receiving device 30 anytime and anywhere, and thus the remote control center 20 may not required, like the conventional system, to have a powerful server for computation and huge storage device for recording all contents from numerous of capturing devices 10. Therefore, the cost for setting up the remote control center 20 can be greatly reduced. Even a general personal computer may be set up as the server of the remote control center 20, depending on the number of capturing devices 10 and receiving devices 30 are required to be linked with.

According to the preferred embodiment, the capturing device 10 is configured between a public mode and a private mode via the remote control center 20. In the public mode, two or more of the receiving devices 30 are allowed to access the contents captured by the capturing device 10. In the private mode, only the receiving device 30 under authorized is allow to access the contents captured by the capturing device 10.

In particular, in the public mode, the contents captured by the capturing device 10 are transmitted to the receiving device 30 through the alternative communication channel 44. In the private mode, the contents captured by the capturing device 10 are transmitted to the receiving device 30 through the communication channel 41.

When other users use the receiving devices 30 to connect to the remote control center 20, the users are able to see all the capturing devices 10 in the public mode. Without any permission by the owner of the capturing device 10, other users are able to access all the capturing devices 10 in the public mode. In other words, when the owner of the capturing device 10 sets the public mode, the contents from the capturing device 10 can be broadcasted through the alternative communication channel 41.

Accordingly, the user is also able to invite friends and families to share the contents captured by the capturing device 10. By inviting other members, the remote control center 20 will send a notification to each invited member, wherein the notification will include information of the capturing device 10 and/or a pass code for the invited member. Therefore, the invited members are able to access the content from the capturing device 10 by their receiving devices 30 when the receiving devices 30 are connected to the remote control center 20 by any web browser. It is worth mentioning that the invited members can access the contents from the capturing device 10 through the communication channel 41 or the alternative communication channel 44.

According to the preferred embodiment, the communication channel 41 and the alternative communication channel 44 are two-way channels. Through the communication channel 41, the user at the capturing device 10 can communicate with the user at the receiving device 30, such as a voice or video conference. It is worth mentioning that the capturing device 10 can be the same as the receiving device 30, wherein the capturing device 10 and the receiving device 30 are able to send and receive different contents through the communication channel 41. For example, the user with the receiving device 30 can see and listen to his or her pet at home when the capturing device 10 is placed at a desired location in the house. The user with the receiving device 30 can also talk to the pet at home through the two-way communication channel 41. Likewise, the alternative communication channel 44 can also work as the communication channel 41, wherein the difference between the alternative communication channel 44 and the communication channel 41 is that the content from the capturing device 10 passes through the storage device 40 to the receiving device 30 via the alternative communication channel 44.

FIG. 6 is a block diagram illustrating the configuration of the capturing device 10 by the remote control center 20. Accordingly, one or more capturing devices 10 are connected to a local router of a local network in order to connect to the remote control center 20 through the Internet. Once the capturing device 10 is connected to the remote control center 20, the information of the capturing device 10 with the local router, such as information of local router being support uPnP (Universal Plug and Play), STUN (Session Traversal Utilities)/TURN (Traversal Using Relay NAT for NAT (network address translator), will be additionally collected by the remote control center 20. Once the configuration of the capturing device 10 is automatically completed by the remote control center 20, the receiving device 30 is ready to access the content, such as video data, through the remote control center 20.

According to the preferred embodiment of the present invention, referring to FIG. 6, the configuration of the capturing device 10 by the remote control center 20 comprises the following steps:

(i) activating the capturing device 10;

(ii) checking whether the local router of the capturing device 10 supporting uPnP;

if it is supported, adding port mapping for whether local router of the capturing device 10, and recording the router port mapping and network information to database of the remote control center 20;

if it is not supported, connecting the remote control center 20 STUN/TURN service to get NAT similar type information in the cloud server located network, and recording the NAT information in the database of the remote control center 20;

(iii) getting corresponding cloud server network information of the capturing device 10 from the database of the remote control center 20; and (iv) determining whether there is any cloud server information, if not, ending the configuration;

if yes, determining whether a cloud server type in an external network, if yes, connecting the cloud server and sending the video data and ending the configuration;

if not, determining whether the cloud server has port mapping information;

if yes, connecting the cloud server and sending the video data and ending the configuration;

if no, using acquired NAT information of the network of the capturing device 10 and cloud servers network for penetration, and determining whether NAT penetration is successful;

if yes, connecting the cloud server point-to-point and sending the video data and ending the configuration;

if not, recording the failure information to the database of the remote control center 20, wherein the cloud server will also use this information in the remote control center 20, and notifying the user connection cloud server failed on receiving device 30 and ending the configuration.

FIG. 7 is a flow diagram illustrating the configuration of the storage device 40 by the remote control center 20, wherein the storage device 40 is embodied as a cloud service as an example.

According to the preferred embodiment of the present invention, referring to FIG. 7, the configuration of the storage device 40 by the remote control center 20 which is embodied as a cloud service by the remote control center 20 comprises the following steps:

(i) activating the cloud server of the remote control center 20;

(ii) determining whether the cloud server is an external network server;

if yes, recording the cloud server network information in server database of the remote control center 20;

if not, determining whether the cloud server local router supports uPnP, wherein if it is supported, adding port mapping for the cloud server local router and recording the router port mapping and network information to server database of the remote control center 20, and if it is not supported, connecting the remote control center 20 server STUN/TURN service to get NAT similar type information in the capturing device 10 located network and recording the NAT information in server database of remote control center 20;

(iii) connecting the remote control center 20 and getting corresponding cloud server network information of the capturing device 10 form database of the remote control center 20; and (iv) checking whether the capturing device 10 is online;

if not, notifying user the capturing device 10 is not online and ending the configuration;

if yes, determining whether the cloud server has port mapping information;

if yes, connecting cloud server and sending the video data and ending the configuration;

if not, using acquired NAT information of network of the capturing device 10 and cloud server network for penetration and determining whether NAT penetration is successful;

if yes, connecting cloud server point-to-point and sending the video data and ending the configuration;

if not, recording the failure information to database of the remote control center 20, notifying the user connection to the capturing device 10 failed to obtain video data and ending configuration.

FIG. 8 is a flow diagram illustrating the configuration of the receiving device 30 by the remote control center 20. It is worth mentioning that the capturing device 10, the storage device 40, and the receiving device 30 are automatically configured by the remote control center 20.

According to the preferred embodiment of the present invention, referring to FIG. 8, the configuration of the receiving device 30 by the remote control center 20 comprises the following steps:

(i) activating the receiving device 30;

(ii) connecting the remote control center 20 and getting the capturing device 10 corresponding network information from server database of the remote control center 20; and (iii) determining whether the capturing device 10 has a router port mapping;

if yes, connecting the receiving device 30 with the capturing device 10 and ending the configuration;

if not, connecting the remote control center 20 server STUN/TURN service to get NAT similar type information in the receiving device 30 located network, using acquired NAT information of the capturing device 10 network and receiving device 30 network for penetration, and determining whether penetration is successful;

if yes, connecting the receiving device 30 to the capturing device 10 point-to-point and ending the configuration;

if not, using the capturing device 10 corresponding network information from server database of the remote control center 20 and determining whether there is cloud server information;

if not, notifying the user connection to cloud server failed on the receiving device 30 and ending the configuration;

if yes, determining whether the cloud server is in an external network;

if yes, connecting the cloud server to get video data and ending the configuration;

if not, determining whether the cloud server has port mapping information;

if yes, connecting the cloud server to get video data and ending configuration;

if not, using acquired NAT information of the receiving device 30 network and the cloud server network for penetration and determining whether NAT penetration is successful;

if yes, connecting the cloud server point-to-point and getting the video data and ending configuration;

if not, recording the failure information to server database of the remote control center 20, notifying the user connection to the cloud server failed on the receiving device 30, and ending the configuration, wherein the cloud server will also use this information in the remote control center 20 service.

It is worth mentioning that for mobile phone or tablet user, the remote control center 20 can provide an application (APP) to download to the receiving device 30, such that the configuration of the application will be automatically configured in the receiving device 30 by the remote control center 20 to link with the capturing device 10.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A method of viewing live and recorded contents, comprising the steps of:
   (a) requesting locator information, including a unique CAM ID and a PIN code, of a capturing device by a remote control center once said capturing device is connected to said remote control center through Internet, wherein said locator information of said capturing device does not contain an IP address of said capturing device;
   (b) sending an accessing request with said CAM ID and said PIN code for said capturing device from an Internet-enabled receiving device to said remote control center through Internet; and
   (c) verifying whether said locator information of said capturing device matches with said accessing request from said receiving device by said remote control center; and
   (d) establishing a communication channel between said capturing device and said receiving device to enable contents captured by said capturing device to be transmitted to said receiving device in a live manner through Internet, wherein said method further comprises a capturing device configuration process for configuration of said capturing device by said remote control center, wherein said capturing device configuration process comprises the steps of: activating said capturing device; checking whether a local router of said capturing device supporting uPnP; if supporting, adding port mapping for whether said local router of said capturing device, and recording said router port mapping and network information to database of said remote control center; if not supporting, connecting said remote control center STUN/TURN service to get a similar type of NAT information in a cloud server located network, and recording said NAT information in said database of said remote control center; getting corresponding cloud server network information of said capturing device from said database of said remote control center; and determining whether there is a cloud server information, if not, ending said configuration process; if yes, determining whether a cloud server type in an external network, if yes, connecting said cloud server and sending video data and ending said capturing device configuration process; if not, determining whether said cloud server has port mapping information; if yes, connecting said cloud server and sending said video data and ending said capturing device configuration process; if not, using acquired NAT information of said network of said capturing device and cloud servers network for penetration, and determining whether NAT penetration is successful; if yes, connecting said cloud server point-to-point and sending said video data and ending said capturing device configuration process; if not, recording failure information to said database of said remote control center, wherein said cloud server will also use said failure information in said remote control center, and notifying the user connection to said cloud server failed on said receiving device and ending said capturing device configuration process.

2. The method, as recited in claim 1, further comprising a receiving device configuration process for configuration of said receiving device by said remote control center, wherein said receiving device configuration process comprises the steps of: activating said receiving device; connecting said remote control center and getting capturing device corresponding network information from server database of said remote control center; and determining whether said capturing device has a router port mapping; if yes, connecting said receiving device with said capturing device and ending said receiving device configuration process; if not, connecting said remote control center server STUN/TURN service to get NAT similar type information in said receiving device located network, using acquired NAT information of said capturing device network and said receiving device network for penetration, and determining whether penetration is successful; if yes, connecting said receiving device to said capturing device point-to-point and ending said receiving device configuration process; if not, using capturing device corresponding network information from server database of said remote control center and determining whether there is cloud server information; if not, notifying said user connection to cloud server failed on said receiving device and ending said receiving device configuration process; if yes, determining whether said cloud server is in an external network; if yes, connecting said cloud server to get video data and ending said receiving device configuration process; if not, determining whether said cloud server has port mapping information; if yes, connecting said cloud server to get video data and ending said receiving device configuration process; if not, using acquired NAT information of said receiving device network and said cloud server network for penetration and determining whether NAT penetration is successful; if yes, connecting said cloud server point-to-point and getting said video data and ending said receiving device configuration process; if not, recording failure information to server database of said remote control center, notifying said user connection to said cloud server failed on said receiving device, and ending said receiving device configuration process, wherein said cloud server would also use this information in service of said remote control center.

3. The method, as recited in claim 2, wherein the step (a) further comprises a step of: (a.1) requesting information of a storage device by said remote control center when said storage device is connected to said remote control center through Internet; (a.2) establishing a recording channel between said capturing device and said storage device to enable said contents captured by said capturing device to be transmitted and stored in said storage device; (a.3) verifying whether said information of said storage device matches with said accessing request from said receiving device by said remote control center; and (a.4) establishing a playback channel between said storage device and said capturing device to enable said contents stored said storage device to be transmitted to said capturing device through Internet.

4. The method, as recited in claim 3, wherein the step (d) further comprises a step of establishing an alternative communication channel between a storage device and said receiving device to enable contents captured by said capturing device to be transmitted to said receiving device from said storage device in a live manner through Internet.

5. The method, as recited in claim 3, further comprising a storage device configuration process for configuration of said storage device by said remote control center, wherein said storage device is a cloud server and said storage device configuration process comprises the steps of: activating said cloud server of said remote control center; determining whether said cloud server is an external network server; if yes, recording cloud server network information in server database of said remote control center; if not, determining whether a cloud server local router supports uPnP, if supporting, adding port mapping for said cloud server local router and recording said router port mapping and network information to server database of said remote control center; if not supporting, connecting said remote control center server STUN/TURN service to get NAT similar type information in said capturing device located network and recording said NAT information in server database of remote control center; connecting said remote control center and getting corresponding cloud server network information of said capturing device form said database of said remote control center; and checking whether said capturing device is online; if not, notifying said user said capturing device is not online and ending said storage device configuration process; if yes, determining whether said cloud server has port mapping information; if yes, connecting said cloud server and sending said video data and ending said storage device configuration process; if not, using acquired NAT information of network of said capturing device and cloud server network for penetration and determining whether NAT penetration is successful; if yes, connecting cloud server point-to-point and sending said video data and ending said storage device configuration process; if not, recording failure information to database of said remote control center, notifying said user connection to said capturing device failed to obtain said video data and ending said storage device configuration process.

6. The method, as recited in claim 5, wherein the step (b) further comprises a step of configuring said capturing device between a public mode and a private mode, wherein in said public mode, two or more of said receiving devices are allowed to access said contents captured by said capturing device, wherein in said private mode, only said receiving device with authorized is allowed to access said contents captured by said capturing device.

7. A capturing device configuration process for configuration of a capturing device by a remote control center, comprising the steps of:
  activating said capturing device;
  checking whether a local router of said capturing device supporting uPnP;
  if supporting, adding port mapping for whether said local router of said capturing device, and recording said router port mapping and network information to database of said remote control center;
  if not supporting, connecting said remote control center STUN/TURN service to get a similar type of NAT information in a cloud server located network, and recording said NAT information in said database of said remote control center;
  getting corresponding cloud server network information of said capturing device from said database of said remote control center; and
  determining whether there is a cloud server information, if not, ending said configuration process;
  if yes, determining whether a cloud server type in an external network,
  if yes, connecting said cloud server and sending video data and ending said capturing device configuration process;
  if not, determining whether said cloud server has port mapping information;
  if yes, connecting said cloud server and sending said video data and ending said capturing device configuration process;
  if not, using acquired NAT information of said network of said capturing device and cloud servers network for penetration, and determining whether NAT penetration is successful;
  if yes, connecting said cloud server point-to-point and sending said video data and ending said capturing device configuration process;
  if not, recording failure information to said database of said remote control center, wherein said cloud server will also use said failure information in said remote control center, and notifying the user connection to said cloud server failed on said receiving device and ending said capturing device configuration process.

8. The process, as recited in claim 7, further comprising a receiving device configuration process for configuration of said receiving device by said remote control center, wherein said receiving device configuration process comprises the steps of:
  activating said receiving device;
  connecting said remote control center and getting capturing device corresponding network information from server database of said remote control center; and
  determining whether said capturing device has a router port mapping;
  if yes, connecting said receiving device with said capturing device and ending said receiving device configuration process;
  if not, connecting said remote control center server STUN/TURN service to get NAT similar type information in said receiving device located network, using acquired NAT information of said capturing device network and said receiving device network for penetration, and determining whether penetration is successful;
  if yes, connecting said receiving device to said capturing device point-to-point and ending said receiving device configuration process;
  if not, using capturing device corresponding network information from server database of said remote control center and determining whether there is cloud server information;
  if not, notifying said user connection to cloud server failed on said receiving device and ending said receiving device configuration process;
  if yes, determining whether said cloud server is in an external network;

if yes, connecting said cloud server to get video data and ending said receiving device configuration process;
if not, determining whether said cloud server has port mapping information;
if yes, connecting said cloud server to get video data and ending said receiving device configuration process;
if not, using acquired NAT information of said receiving device network and said cloud server network for penetration and determining whether NAT penetration is successful;
if yes, connecting said cloud server point-to-point and getting said video data and ending said receiving device configuration process;
if not, recording failure information to server database of said remote control center, notifying said user connection to said cloud server failed on said receiving device, and ending said receiving device configuration process, wherein said cloud server would also use this information in service of said remote control center.

9. The process, as recited in claim 7, further comprising a storage device configuration process for configuration of a storage device by said remote control center, wherein said storage device is a cloud server and said storage device configuration process comprises the steps of:
activating said cloud server of said remote control center;
determining whether said cloud server is an external network server;
if yes, recording cloud server network information in server database of said remote control center;
if not, determining whether a cloud server local router supports uPnP,
if supporting, adding port mapping for said cloud server local router and recording said router port mapping and network information to server database of said remote control center;
if not supporting, connecting said remote control center server STUN/TURN service to get NAT similar type information in said capturing device located network and recording said NAT information in server database of remote control center;
connecting said remote control center and getting corresponding cloud server network information of said capturing device form said database of said remote control center; and
checking whether said capturing device is online;
if not, notifying said user said capturing device is not online and ending said storage device configuration process;
if yes, determining whether said cloud server has port mapping information;
if yes, connecting said cloud server and sending said video data and ending said storage device configuration process;
if not, using acquired NAT information of network of said capturing device and cloud server network for penetration and determining whether NAT penetration is successful;
if yes, connecting cloud server point-to-point and sending said video data and ending said storage device configuration process;
if not, recording failure information to database of said remote control center, notifying said user connection to said capturing device failed to obtain said video data and ending said storage device configuration process.

10. The process, as recited in claim 8, further comprising a storage device configuration process for configuration of a storage device by said remote control center, wherein said storage device is a cloud server and said storage device configuration process comprises the steps of:
activating said cloud server of said remote control center;
determining whether said cloud server is an external network server;
if yes, recording cloud server network information in server database of said remote control center;
if not, determining whether a cloud server local router supports uPnP,
if supporting, adding port mapping for said cloud server local router and recording said router port mapping and network information to server database of said remote control center;
if not supporting, connecting said remote control center server STUN/TURN service to get NAT similar type information in said capturing device located network and recording said NAT information in server database of remote control center;
connecting said remote control center and getting corresponding cloud server network information of said capturing device form said database of said remote control center; and
checking whether said capturing device is online;
if not, notifying said user said capturing device is not online and ending said storage device configuration process;
if yes, determining whether said cloud server has port mapping information;
if yes, connecting said cloud server and sending said video data and ending said storage device configuration process;
if not, using acquired NAT information of network of said capturing device and cloud server network for penetration and determining whether NAT penetration is successful;
if yes, connecting cloud server point-to-point and sending said video data and ending said storage device configuration process;
if not, recording failure information to database of said remote control center, notifying said user connection to said capturing device failed to obtain said video data and ending said storage device configuration process.

11. A system for viewing live and recorded contents by an Internet-enabled receiving device, comprising:
at least a capturing device containing locator information, including a CAM ID and a PIN code of said capturing device, that does not contain an IP address thereof and is configured for linking with the receiving device through Internet; and
a remote control center operatively linked to said capturing device through the Internet and arranged for receiving an accessing request from said receiving device through Internet, wherein said locator information of said capturing device is sent to said remote control center when said capturing device is connected to said remote control center, wherein said remote control center comprises a verifying module for verifying whether said locator information of said capturing device matches with said accessing request from said receiving device, wherein once said locator information of said capturing device is verified by said remote control center matching with said accessing request from the receiving device, a communication channel is established between said capturing device and said receiving device for enabling contents captured by said capturing device to be transmitted to said receiving device in a live manner through Internet, wherein said capturing device is configured by said remote control center by the following steps:

activating said capturing device;

checking whether a local router of said capturing device supporting uPnP;

if supporting, adding port mapping for whether said local router of said capturing device, and recording said router port mapping and network information to database of said remote control center;

if not supporting, connecting said remote control center STUN/TURN service to get a similar type of NAT information in a cloud server located network, and recording said NAT information in said database of said remote control center;

getting corresponding cloud server network information of said capturing device from said database of said remote control center; and determining whether there is a cloud server information, if not, ending said configuration process;

if yes, determining whether a cloud server type in an external network, if yes, connecting said cloud server and sending video data and ending said capturing device configuration process;

if not, determining whether said cloud server has port mapping information;

if yes, connecting said cloud server and sending said video data and ending said capturing device configuration process;

if not, using acquired NAT information of said network of said capturing device and cloud servers network for penetration, and determining whether NAT penetration is successful;

if yes, connecting said cloud server point-to-point and sending said video data and ending said capturing device configuration process;

if not, recording failure information to said database of said remote control center, wherein said cloud server will also use said failure information in said remote control center, and notifying the user connection to said cloud server failed on said receiving device and ending said capturing device configuration process.

12. The system, as recited in claim 11, wherein said receiving device is configured by said remote control center by the following steps:

activating said receiving device; connecting said remote control center and getting capturing device corresponding network information from server database of said remote control center; and determining whether said capturing device has a router port mapping;

if yes, connecting said receiving device with said capturing device and ending said receiving device configuration process;

if not, connecting said remote control center server STUN/TURN service to get NAT similar type information in said receiving device located network, using acquired NAT information of said capturing device network and said receiving device network for penetration, and determining whether penetration is successful;

if yes, connecting said receiving device to said capturing device point-to-point and ending said receiving device configuration process;

if not, using capturing device corresponding network information from server database of said remote control center and determining whether there is cloud server information;

if not, notifying said user connection to cloud server failed on said receiving device and ending said receiving device configuration process;

if yes, determining whether said cloud server is in an external network;

if yes, connecting said cloud server to get video data and ending said receiving device configuration process;

if not, determining whether said cloud server has port mapping information;

if yes, connecting said cloud server to get video data and ending said receiving device configuration process;

if not, using acquired NAT information of said receiving device network and said cloud server network for penetration and determining whether NAT penetration is successful;

if yes, connecting said cloud server point-to-point and getting said video data and ending said receiving device configuration process;

if not, recording failure information to server database of said remote control center, notifying said user connection to said cloud server failed on said receiving device, and ending said receiving device configuration process, wherein said cloud server would also use this information in service of said remote control center.

13. The system, as recited in claim 12, wherein said remote control center is arranged to be capable of establishing a recording channel to link a storage device with said capturing device, wherein said remote control center is arranged for receiving information of said storage device to establish said recording channel between said capturing device and said storage device so as to enable said contents captured by said capturing device to be transmitted and stored in said storage device.

14. The system, as recited in claim 13, wherein said remote control center is arranged to be capable of establishing a playback channel to link said storage device with said receiving device, wherein said verifying module is arranged for verifying whether said information of said storage device matches with said accessing request from said receiving device, such that said playback channel is established between said storage device and said capturing device for enabling said contents stored said storage device to be transmitted to said capturing device through Internet.

15. The system, as recited in claim 14, wherein said remote control center is arranged to be capable of establishing an alternative communication channel between said storage device and said receiving device for enabling contents captured by said capturing device to be transmitted to said receiving device from said storage device in a live manner through Internet.

16. The system, as recited in claim 15, wherein said storage device is configured by said remote control center by the following steps:

activating said cloud server of said remote control center;

determining whether said cloud server is an external network server;

if yes, recording cloud server network information in server database of said remote control center;

if not, determining whether a cloud server local router supports uPnP, if supporting, adding port mapping for said cloud server local router and recording said router port mapping and network information to server database of said remote control center;

if not supporting, connecting said remote control center server STUN/TURN service to get NAT similar type information in said capturing device located network and recording said NAT information in server database of remote control center;

connecting said remote control center and getting corresponding cloud server network information of said capturing device form said database of said remote control center; and checking whether said capturing device is online;

if not, notifying said user said capturing device is not online and ending said storage device configuration process;

if yes, determining whether said cloud server has port mapping information;

if yes, connecting said cloud server and sending said video data and ending said storage device configuration process;

if not, using acquired NAT information of network of said capturing device and cloud server network for penetration and determining whether NAT penetration is successful;

if yes, connecting cloud server point-to-point and sending said video data and ending said storage device configuration process;

if not, recording failure information to database of said remote control center, notifying said user connection to said capturing device failed to obtain said video data and ending said storage device configuration process.

17. The system, as recited in claim 16, wherein said capturing device is configured between a public mode and a private mode, wherein in said public mode, two or more of said receiving devices are allowed to access said contents captured by said capturing device, wherein in said private mode, only said receiving device with authorized is allowed to access said contents captured by said capturing device, wherein in said public mode, said contents captured by said capturing device is transmitted to said receiving device through said alternative communication channel, and in said private mode, said contents captured by said capturing device is transmitted to said receiving device through said communication channel.

* * * * *